United States Patent
Yang et al.

(10) Patent No.: US 9,869,693 B2
(45) Date of Patent: Jan. 16, 2018

(54) ACCELERATION SENSOR, DISPLAY DEVICE, DETECTING SYSTEM AND DETECTING METHOD

(71) Applicants: BOE Technology Group Co., Ltd., Beijing (CN); Beijing BOE Optoelectronics Technology Co., Ltd., Beijing (CN)

(72) Inventors: Jiuxia Yang, Beijing (CN); Zhidong Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 15/310,348

(22) PCT Filed: Mar. 3, 2016

(86) PCT No.: PCT/CN2016/075459
§ 371 (c)(1),
(2) Date: Nov. 10, 2016

(87) PCT Pub. No.: WO2017/049879
PCT Pub. Date: Mar. 30, 2017

(65) Prior Publication Data
US 2017/0269120 A1  Sep. 21, 2017

(30) Foreign Application Priority Data

Sep. 24, 2015 (CN) .......................... 2015 1 0617496

(51) Int. Cl.
*G02B 26/00* (2006.01)
*G01P 15/125* (2006.01)
*G01P 15/08* (2006.01)

(52) U.S. Cl.
CPC ........ *G01P 15/125* (2013.01); *G01P 15/0802* (2013.01); *G02B 26/005* (2013.01)

(58) Field of Classification Search
CPC .. G01P 15/125; G01P 15/0802; G02B 26/005
(Continued)

(56) References Cited

U.S. PATENT DOCUMENTS 5,788,655 A   8/1998  Yoshimura et al.
6,276,206 B1  8/2001  Reime
(Continued)

FOREIGN PATENT DOCUMENTS

CN   1133165 A   10/1996
CN   1668892 A   9/2005
(Continued)

OTHER PUBLICATIONS

Jun. 23, 2016—International Search Report and Written Opinion Appn PCT/CN2016/075459 with Eng Tran.
(Continued)

*Primary Examiner* — Tuyen Tra
(74) *Attorney, Agent, or Firm* — Banner & Witcoff, Ltd.

(57) ABSTRACT

An acceleration sensor, a display device, a detecting system and a detecting method are provided; the acceleration sensor includes two electrodes arranged opposite to and insulated from each other, and a cavity arranged between the two electrodes; a liquid layer is arranged in the cavity, and the liquid layer occupies a portion of internal space of the cavity. A display device integrated with the acceleration sensor has advantages such as high degree of integration, compact structure and low production cost and so on.

20 Claims, 4 Drawing Sheets

(58) Field of Classification Search
USPC ............... 359/290–292, 228, 665, 226.3
See application file for complete search history.

(56) References Cited

U.S. PATENT DOCUMENTS

| | | | |
|---|---|---|---|
| 7,265,910 B2 * | 9/2007 | Ito | ............... G02B 15/00 359/665 |
| 2005/0210979 A1 | 9/2005 | Urano et al. | |
| 2012/0242610 A1 | 9/2012 | Yasumatsu | |
| 2015/0153778 A1 | 6/2015 | Jung | |
| 2015/0277102 A1 | 10/2015 | Park et al. | |
| 2016/0125780 A1 * | 5/2016 | Visser | ............... G09G 3/20 73/514.09 |

FOREIGN PATENT DOCUMENTS

| | | | |
|---|---|---|---|
| CN | 1831539 | A | 9/2006 |
| CN | 101093229 | A | 12/2007 |
| CN | 102667678 | A | 9/2012 |
| CN | 103137100 | A | 6/2013 |
| CN | 103472578 | A | 12/2013 |
| CN | 103712601 | A | 4/2014 |
| CN | 104488260 | A | 4/2015 |
| CN | 104680958 | A | 6/2015 |
| CN | 105116169 | A | 12/2015 |
| CN | 205091356 | U | 3/2016 |
| DE | 4201884 | A1 | 7/1993 |
| EP | 2059845 | B1 | 2/2013 |
| JP | H09152355 | A | 6/1997 |
| JP | 2001324513 | A | 11/2001 |

OTHER PUBLICATIONS

Zhu Yi, et al., "The Development of the Portable Intelligent Real Time Activity Measurement Device", China Medical Equipment, Aug. 31 2007, vol. 4, Issue 8, pp. 6-8.

Liao Ping, et al."Preliminary Research on Magnetic Fluid Accelerometer", Functional Material, Nov. 11, 2015, vol. 35, pp. 573-576.

Nang Anming, et al., "Design and Implementation of Intelligent VSR Control Device LCD", Industrial Control computer, Dec. 21 2008, vol. 21, Issue 12, pp. 69-70.

Aug. 1, 2017 — (CN) First Office Action Appn 201510617496.1 with English Tran.

Nov. 28, 2017 (CN) Second Office Action Application CN 201510617496.1 with English Translation.

* cited by examiner

Output the calculated result

US 9,869,693 B2

ACCELERATION SENSOR, DISPLAY DEVICE, DETECTING SYSTEM AND DETECTING METHOD

The application is a U.S. National Phase Entry of International Application No. PCT/CN2016/075459 filed on Mar. 3, 2016, designating the United States of America and claiming priority to Chinese Patent Application No. 201510617496.1, filed Sep. 24, 2015. The present application claims priority to and the benefit of the above-identified applications and the above-identified applications are incorporated by reference herein in their entirety.

TECHNICAL FIELD

At least one embodiment of the present disclosure provides an acceleration sensor, a display device, a detecting system and a detecting method.

BACKGROUND

A transducer/sensor is a detecting device, which can sense information to be measured, and convert the sensed information into electrical signals or into information output in other required forms according to a certain law or rule, so as to meet requirements such as information transmission, processing, storage, display, recording and control, and so on.

An acceleration sensor is an electronic device which can measure acceleration and displacement. For example, the acceleration sensor can detect AC signals and vibration of an object. For example, people in motion may generate certain regular vibration, and the acceleration sensor can detect a zero crossing point of the vibration to calculate the number of walking or running steps of the person, so as to calculate the acceleration or the displacement by the person.

With the development of the display technology and constant increase in application requirements of a user on display products, mobile terminals such as a cell phone, a tablet computer or the like are incorporated with a variety of sensors to form the display device having various monitoring functions, which has become a hot spot of research in the related art.

SUMMARY

At least one embodiment of the present disclosure provides an acceleration sensor, a display device, a detecting system and a detecting method, so as to provide a new acceleration sensor and improve degree of integration of the acceleration sensor and the display device.

At least one embodiment of the present disclosure provides an acceleration sensor, comprising: two electrodes arranged opposite to and insulated from each other, and a cavity arranged between the two electrodes, wherein, a liquid layer is arranged in the cavity, the liquid layer occupying a portion of internal space of the cavity.

At least one embodiment of the present disclosure provides a display device, comprising the above-described acceleration sensor.

At least one embodiment of the present disclosure provides a detecting system for the above-described display device, comprising: a signal receiving module, configured to acquire capacitance values of the at least three acceleration sensors at a first time and capacitance values of the at least three acceleration sensors at a second time, respectively; a calculating module, configured to respectively calculate a capacitance value change amount of each acceleration sensor according to the capacitance value at the first time and the capacitance value at the second time, respectively calculate a sensing result of the acceleration sensor according to the capacitance value change amount, and calculate an absolute value of a difference between a sensing result of each acceleration sensor and a sensing result of each of the remaining acceleration sensors; and a judging module, configured to determine whether the absolute value is in a predetermined threshold range, wherein, if an absolute value of a difference between a sensing result of one acceleration sensor and a sensing result of each of at least two of the remaining acceleration sensors is out of the predetermined threshold range, the sensing result of the acceleration sensor is determined not in a normal range; the sensing result is an acceleration or a displacement.

At least one embodiment of the present disclosure provides a detecting method for the above-described display device, comprising: acquiring capacitance values of the at least three acceleration sensors at a first time and capacitance values of the at least three acceleration sensors at a second time, respectively; respectively calculating an a capacitance value change amount of each acceleration sensor according to the capacitance value at the first time and the capacitance value at the second time, respectively calculate a sensing result of the acceleration sensor according to the capacitance value change amount, and calculate an absolute value of a difference between a sensing result of each acceleration sensor and a sensing result of each of the remaining acceleration sensors; and determining whether the absolute value is in a predetermined threshold range, wherein, if an absolute value of a difference between a sensing result of one acceleration sensor and a sensing result of each of at least two of the remaining acceleration sensors is out of the predetermined threshold range, the sensing result of the acceleration sensor is determined not in a normal range; the sensing result is an acceleration or a displacement.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In study, inventors of the present disclosure have noted that, in a current mobile terminal, acceleration sensors are individually manufactured by using a Micro Electro-Mechanical System (MEMS) process, and then placed on a motherboard of the terminal product, but in this way, there is a disadvantage of low degree of integration.

At least one embodiment of the present disclosure provides an acceleration sensor, a display device integrated with the acceleration sensor, and a detecting system and a detecting method for the display device. The acceleration sensor provided by the embodiment of the present disclosure may be manufactured with a display region structure of the display device synchronously, so that the display device has high degree of integration, compact structure and low production cost.

Embodiment I

Figure 1A:
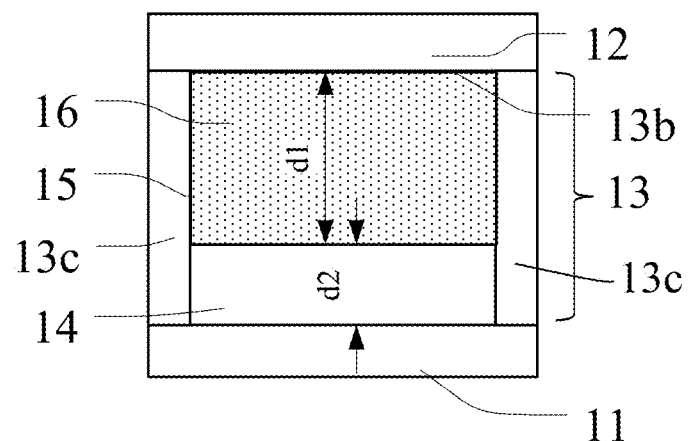
FIG. 1a is a structural schematic view of an acceleration sensor provided by Embodiment I of the present disclosure.
Figure 1B:
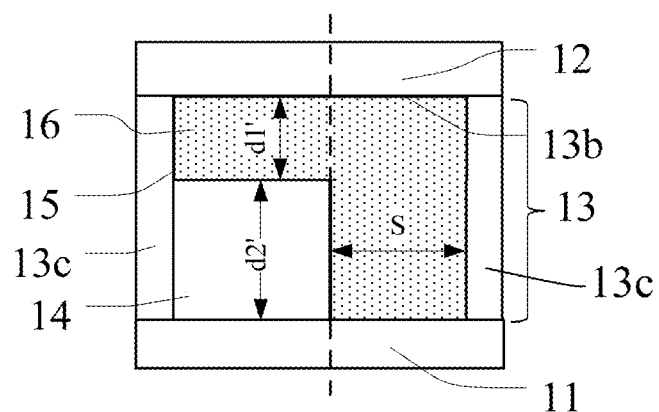
FIG. 1b is a structural schematic view of the acceleration sensor provided by Embodiment I of the present disclosure in a case of moving.
Figure 1C:
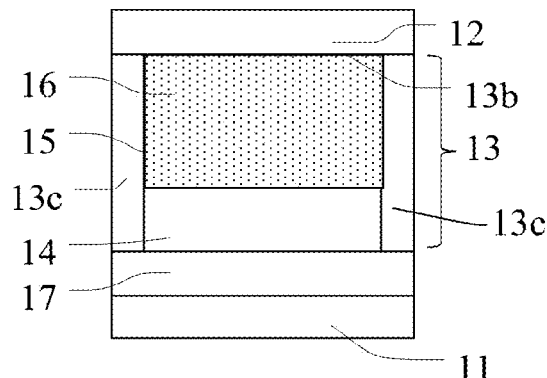
FIG. 1c is a structural schematic view of another acceleration sensor provided by Embodiment I of the present disclosure.

The present embodiment provides an acceleration sensor, and as shown in FIGS. 1a to 1c, the acceleration sensor 10 comprises two electrodes arranged opposite to and insulated from each other, i.e., a first electrode 11 and a second electrode 12, and a cavity 13 arranged between these two electrodes; a liquid layer 14 is provided in the cavity 13, and the liquid layer 14 occupies a portion of the internal space of the cavity 13, i.e., a volume of the liquid layer 14 in the cavity 13 occupies a portion of the volume of the cavity 13, that is, there is a certain distance from the liquid layer 14 to at least part of an inner surface (e.g., an inner surface 13b) of the cavity 13.

In the present embodiment, "a certain distance" only means that the liquid layer 14 is not in contact with the inner surface 13b of the cavity 13, but is not limitative in the length of the distance.

In the acceleration sensor provided by the embodiment, the first electrode 11 and the second electrode 12 are arranged opposite to and insulated from each other, so that capacitance can be generated therebetween; since the liquid layer 14 occupies a portion of internal space of the cavity 13, when the acceleration sensor is in a process of accelerating motion, the liquid layer 14 can be moved in the cavity 13 due to inertia, and a change in the capacitance between the first electrode 11 and the second electrode 12 can be caused by the motion of the liquid layer 14, and thus the displacement of the liquid layer 14 can be calculated according to the change in the capacitance between the first electrode 11 and the second electrode 12, so as to calculate an acceleration of the acceleration sensor.

For example, a gap 15 may be left between the liquid layer 14 and the inner surface 13b of the cavity 13 in order to facilitate the liquid layer 14 to move in the cavity 13 smoothly. For example, the gap 15 may occupy the remaining internal space of the cavity 13 except for the space occupied by the liquid layer 14. For example, the gap 15 may be filled with insulating gas 16, and the insulating gas 16 has a dielectric constant different from that of the liquid in the liquid layer 14. For example, the insulating gas 16 is immiscible with the liquid in the liquid layer 14. For example, the insulating gas 16 may be a gas commonly known in the art such as nitrogen, inert gas, air or the like.

Of course, besides the liquid layer 14 arranged in the cavity 13, other liquid may be filled in the remaining internal space, that is, a second liquid layer may be further arranged in the cavity 13. The liquid in the second liquid layer is immiscible with the liquid in the liquid layer 14; the liquid in the second liquid layer and the liquid in the liquid layer 14 may fully fill entire internal space of the cavity 13, or may not fill the entire internal space of the cavity 13.

The first electrode 11 and the second electrode 12 may be made of a material or materials commonly used in the art, for example, metal such as aluminum, magnesium, molybdenum, titanium, copper or zirconium, or conductive metal oxide such as ITO (indium tin oxide) or the like, which is not limited here. It should be noted that, the first electrode 11 and the second electrode 12 only represent two different electrodes, and positions thereof are exchangeable.

The cavity 13 may be implemented in a variety of ways. For example, the portions forming the cavity 13 may include at least one of the first electrode 11 and the second electrode 12. For example, as shown in FIGS. 1a and 1b, the cavity 13 may be formed by sealingly connecting the first electrode 11, the second electrode 12 and a sidewall 13c located therebetween, that is, the first electrode 11 and the second electrodes 12 respectively serve as a bottom plate and a top plate of the cavity 13, and in this case, the inner surface 13b of the cavity 13 is the surface of the second electrode 12 facing the liquid layer 14. Alternatively, for example, as shown in FIG. 1c, the cavity 13 may be formed by sealingly connecting the first electrode 11, a solid insulating layer 17 and a sidewall 13c arranged therebetween, and in this case, the inner surface 13b of the cavity 13 is the surface of the second electrode 12 facing the liquid layer 14. Of course, the cavity 13 may be also formed separately, and then fixed between the first electrode 11 and the second electrode 12 to form the acceleration sensor 10.

The liquid in the liquid layer 14 may be any kind of liquid, for example, the liquid may be insulating, such as a kind of insulating ink or the like, or the liquid may be conductive, such as a salt solution or the like.

For example, in a case where the liquid in the liquid layer 14 is a conductive liquid, in order to prevent the conductive liquid from electrically conducting the first electrode 11 with the second electrode 12, a solid insulating layer 17 for separating the liquid layer 14 from at least one of the first electrode 11 and the second electrode 12 may be arranged therebetween, as shown in FIG. 1c. The present embodiment of the present disclosure does not limit a material of the solid insulating layer 17, as long as it may prevent the liquid layer 14 from electrically conducting the first electrode 11 with the second electrode 12. For example, the solid insulating layer 17 may be connected with a sidewall of the cavity intersecting with the first electrode 11 or the second electrode 12, to prevent the first electrode 11 and the second electrode 12 from being electrically conducted when the liquid layer 14 moves.

Of course, a solid insulating layer may be further arranged between the liquid layer 14 and at least one of the first electrode 11 and the second electrode 12 in a case where the liquid in the liquid layer 14 is an insulating liquid according to actual needs.

Hereinafter, the working principle of the acceleration sensor provided by the present embodiment is described in connection with FIGS. 1a and 1b by taking an example that the dielectric constant of the insulating gas 16 is $\epsilon_1$, the liquid in the liquid layer 14 is an insulating liquid and the dielectric constant thereof is $\epsilon_2$.

As shown in FIG. 1a, in a case where the acceleration sensor 10 is in a static state, the liquid layer 14 is flatly laid on the first electrode 11 and in contact with the sidewall 13c of the cavity 13, and the distance between the liquid layer 14 and the second electrode 12 is $d_1$; and in this case, the capacitance $C_0$ between the first electrode 11 and the second electrode 12 is equal to the capacitance value of the capacitor $C_1$ generated by the insulating gas 16 and the capacitor $C_2$ generated by the liquid layer 14 that are connected in series, the capacitance $C_1 = \epsilon_1 A/4\pi k d_1$ and the capacitance $C_2 = \epsilon_2 A/4\pi k d_2$, where A denotes an area in which both the first electrode 11 and the second electrode 12 correspond to the liquid layer 14 and the insulating gas 16.

As shown in FIG. 1b, according to the principle of inertia, in a case where the acceleration sensor moves, the liquid layer 14 moves in the direction opposite to the moving direction, and thus a certain distance S (the distance S is a displacement of the acceleration sensor) between the liquid in the liquid layer 14 and the sidewall 13c of the cavity 13 is generated, and the distance between the liquid layer 14 and the second electrode 12 is reduced to $d_1'$; and in this case, the capacitance $C_0'$ between the first electrode 11 and the second electrode 12 is a result of connecting the capacitor $C_{11}$ generated by a first portion (as shown on a left side of a dotted line in FIG. 1b) of the insulating gas 16 with the capacitor $C_2'$ generated by the liquid layer 14 in series and then connecting with the capacitor $C_{12}$ generated by a second portion of the insulating gas 16 (as shown on a right side of the dotted line in FIG. 1b) in parallel, where the capacitance $C_{11} = \epsilon_1 A_1/4\pi k d_1'$, the capacitance $C_2' = \epsilon_2 A_1/4\pi k d_2'$, and the capacitance $C_{12} = \epsilon_1 A_2/4\pi k(d_1'+d_2')$, $A_1$ denotes an area in which the first electrode 11 and the second electrode 12 correspond to the liquid layer 14 and the first portion of the insulating gas 16, and $A_2$ denotes an area in which the first electrode 11 and the second electrode 12 correspond to the second portion of the insulating gas 16.

By respectively detecting the capacitances $C_0$ and $C_0'$ of the acceleration sensor in static state and accelerating state and calculating an amount of change in the capacitance, the displacement S of the liquid layer 14 in the acceleration sensor 10 can be calculated according to the amount of change in the capacitance, and further the acceleration of the acceleration sensor is calculated, so as to sense the displacement and the acceleration.

Similarly, in a case where the liquid in the liquid layer 14 is a conductive liquid, the capacitance $C_0$ between the first electrode and the second electrode in FIG. 1a is equal to the capacitance $C_1 = \epsilon_1 A/4\pi k d_1$ generated by the insulating gas 16; and the capacitance $C_0'$ between the first electrode and the second electrode in FIG. 1b is a result by connecting the capacitor $C_{11}$ generated by a first portion of the insulating gas 16 and a capacitor $C_{12}$ generated by a second portion of the insulating gas 16 in parallel, where the capacitance $C_{11} = \epsilon_1 A_1/4\pi k d_1'$, and the capacitance $C_{12} = \epsilon_1 A_2/4\pi k(d_1'+d_2')$. The displacement or the acceleration sensed by the acceleration sensor can be calculated according to $C_0$, $C_0'$.

Embodiment II

The embodiment provides a display device, which comprises the acceleration sensor 10 provided by Embodiment I.

Figure 2A:
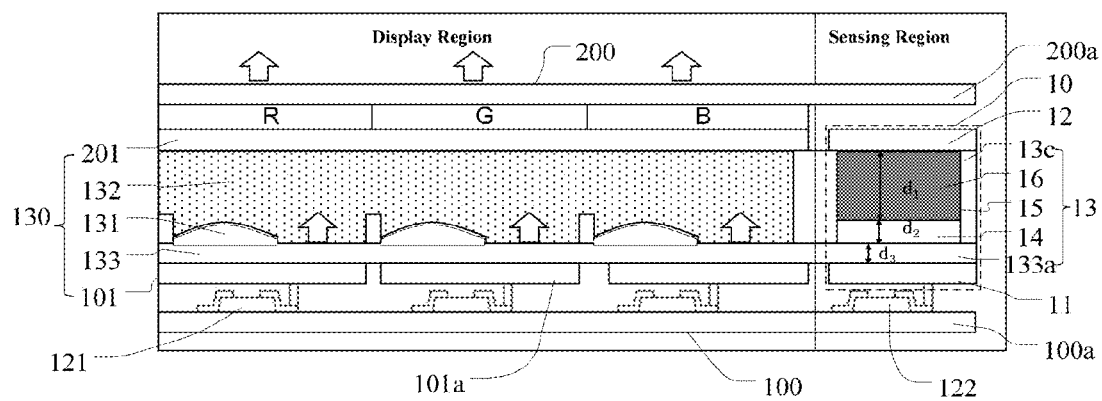
FIG. 2a is a structural schematic view of a display device provided by Embodiment II of the present disclosure.
Figure 2B:
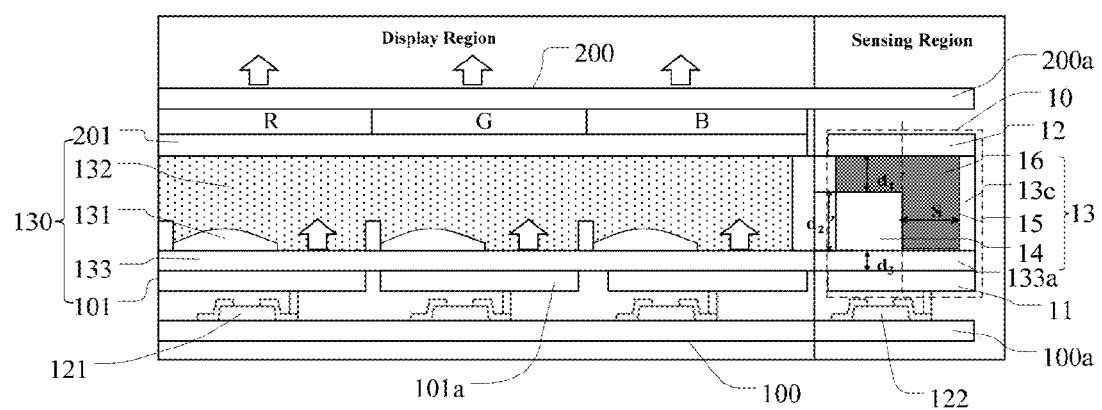
FIG. 2b is a structural schematic view of the acceleration sensor provided by Embodiment II of the present disclosure in case of moving.

For example, as shown in FIGS. 2a and 2b, the display device provided by the embodiment may have a display region and a sensing region, and comprises an array substrate 100 having a first base substrate 100a and an opposed substrate 200 arranged opposite to the array substrate 100 and having a second base substrate 200a; in the sensing region, an acceleration sensor 10 is arranged between the first base substrate 100a and the second base substrate 200a, and the acceleration sensor 10 comprises two electrodes arranged opposite to and insulated from each other, i.e., a first electrode 11 and a second electrode 12, and a cavity 13 arranged between these two electrodes; a liquid layer 14 is provided in the cavity 13, and the liquid layer 14 occupies a portion of internal space of the cavity 13, that is, the cavity 13 has an inner surface (not shown) facing the liquid layer 14, and there is a certain distance from the liquid layer 14 to the inner surface.

It should be noted that, the acceleration sensor 10 may be configured with reference to Embodiment I, which will not be repeated here; FIGS. 2a and 2b only take an example that the first electrode 11 of the acceleration sensor is located in a lower layer and the second electrode 12 is located in an upper layer for description, however, positions of the first electrode 11 and the second electrode 12 are also exchangeable.

In the display device provided by the embodiment, the acceleration sensor 10 is arranged between the array substrate 100 and the opposed substrate 200 and may be manufactured with a structure of the display region synchronously, so that the display device provided by the embodiment has advantages such as high degree of integration, compact structure and low production cost.

For example, in the display region, an electrowetting structure 130 may be arranged between the first base substrate 100a and the second base substrate 200a, and the electrowetting structure 130 may include two transparent electrodes arranged opposite to each other, i.e., a first transparent electrode 101 and a second transparent electrode 201, and a display region hydrophobic layer 133, a display region first fluid layer 131 and a display region second fluid layer 132 which are arranged between the first transparent electrode 101 and the second transparent electrode 201; and the display region first fluid layer 131 is arranged between the display region hydrophobic layer 133 and the display region second fluid layer 132 in the direction perpendicular to a plane where the first base substrate 100a is located.

The first transparent electrode 101 and the second transparent electrode 201 may be used for applying a voltage to the display region first fluid layer 131. For example, the first transparent electrode 101 and the second transparent electrode 201 may be made of a transparent conductive metal oxide such as indium zinc oxide, indium tin oxide, indium gallium zinc oxide, or other transparent conductive material. It should be noted that, FIG. 2a only takes an example that the first transparent electrode 101 is located in a lower layer and the second transparent electrode 201 is located in an upper layer for description, however, positions of the first transparent electrode 101 and the second transparent electrode 201 are also exchangeable.

The display region hydrophobic layer 133 has a hydrophobic property. The contact angle between the display region hydrophobic layer 133 and the display region first fluid layer 131 may be changed in a case where a voltage is applied to the display region first fluid layer 131. The display region hydrophobic layer 133 may be a hydrophobic material commonly used in the art, for example, the display region hydrophobic layer 133 may be a fluid hydrophobic material such as organosilicone or the like, or may be a solid hydrophobic material such as polyethylene (PE), polymethylmethacrylate (PMMA) or the like.

The position of fluid in the display region first fluid layer 131 may be changed under an action of voltage, so that an area of a light-transmitting portion of each pixel region (e.g., a region corresponding to each sub-electrode 101a in FIGS. 2a and 2b) is changed. For example, the fluid in the display region first fluid layer 131 may be a black ink or ink of other colors commonly used in the art.

Fluid in the display region second fluid layer 132 may wet the surface of the display region hydrophobic layer 133, to force the fluid in the display region first fluid layer 131 to move. For example, the fluid in the display region second fluid layer 132 may be water or salt solution or the like that is commonly used in the art.

A display principle of the electrowetting structure 130 is described below. When no voltage is applied across the first transparent electrode 101 and the second transparent electrode 201, the surface of the display region hydrophobic layer 133 is uniformly covered by the fluid in the display region first fluid layer 131, and in this case the electrowetting structure 130 is in a light-tight state. When voltages are respectively applied to the first transparent electrode 101 and the second transparent electrode 201, an electric field is generated between the first transparent electrode 101 and the second transparent electrode 201, and the contact angle between liquid droplet in the display region first fluid layer 131 and the display region hydrophobic layer 133 is changed by the electric field, so as to cause expansion and contraction of the liquid droplet, which changes the area of the light-transmitting portion of a pixel region, to realize control of display.

In the embodiment, since the electrowetting structure 130 is similar to the acceleration sensor 10 in the layer structure, arranging the electrowetting structure 130 in the display region is conducive to manufacture the acceleration sensor 10 with the display region structure synchronously, and improve the degree of integration of the acceleration sensor and a display panel including the array substrate and the opposed substrate.

For example, at least one of the first electrode 11 and the second electrode 12 of the acceleration sensor 10 may be arranged in the same layer as at least one of the first transparent electrode 101 and the second transparent electrode 201 of the electrowetting structure. That is, one of the first electrode 11 and the second electrode 12 of the acceleration sensor 10 may be arranged in the same layer as one of the first transparent electrode 101 and the second transparent electrode 201 of the electrowetting structure; or, as shown in FIGS. 2a and 2b, the first electrode 11 and the second electrode 12 of the acceleration sensor 10 may be arranged in the same layers as the first transparent electrode 101 and the second transparent electrode 201 of the electrowetting structure, respectively. In this way, in a patterning process of fabricating the first/second transparent electrodes of the electrowetting structure in the display region, the first/second electrodes of the acceleration sensor in the sensing region may be further formed to reduce manufacturing processes, and improve the degree of integration of the acceleration sensor and the display panel.

For example, in a case where the display region hydrophobic layer 133 is made of a solid hydrophobic material, the display region hydrophobic layer 133 of the electrowetting structure 130 may include a portion 133a extending to the sensing region, and the portion 133a may be connected with a sidewall 13c of the cavity 13. In this way, a fabrication of the cavity 13 of the acceleration sensor 10 may be simplified and the degree of integration of the acceleration sensor 10 and the display panel can be improved. In another aspect, the portion 133a of the display region hydrophobic layer 133 extending to the sensing region may be used as a solid insulating layer of the acceleration sensor, but the embodiment according to the present disclosure is not limited thereto, and the solid insulating layer of the acceleration sensor 10 may be additionally arranged.

For example, the fluid in the display region first fluid layer 131 of the electrowetting structure 130 and the liquid in the liquid layer 14 of the acceleration sensor 10 may be the same material, so that the liquid layer 14 of the acceleration sensor 10 may be formed in the sensing region when the display region first fluid layer 131 is formed, to reduce manufacturing processes, and improve the degree of integration of the acceleration sensor and the display panel.

In general, one of the first transparent electrode and the second transparent electrode of the electrowetting structure may include a plurality of sub-electrodes arranged in a matrix, a plurality of thin film transistors arranged in a matrix are provided on a base substrate where the electrowetting structure is located, and the plurality of thin film transistors are correspondingly connected with the plurality of sub-electrodes of the electrowetting structure, respectively, so as to supply voltages to the sub-electrodes respectively.

For example, in FIGS. 2a and 2b, a first thin film transistor 121 and a second thin film transistor 122 are arranged between the first base substrate 100a and the second base substrate 200a; the first transparent electrode 101 or the second transparent electrode 201 of the electrowetting structure 130 may be electrically connected with the first thin film transistor 121; the first electrode 11 or the second electrode 12 of the acceleration sensor 10 may be electrically connected with the second thin film transistor 122, and the second thin film transistor 122 may supply a voltage to the acceleration sensor 10 through the first electrode 11 or the second electrode 12 connected thereto. A voltage is supplied to the acceleration sensor 10 via the second thin film transistor 122, since the second thin film transistor 122 may be formed with the first thin film transistor 121 synchronously, manufacturing processes can be reduced, and the degree of integration of the acceleration sensor and the display panel can be improved.

FIGS. 2a and 2b only takes an example that the first transparent electrode 101 of the electrowetting structure 130 includes a plurality of sub-electrodes 101a and is electrically connected with the first thin film transistor 121 and the first electrode 11 of the acceleration sensor 10 is electrically connected with the second thin film transistor 122 for description, and the embodiments of the present disclosure include, but are not limited thereto.

FIGS. 2a and 2b take an example that the opposed substrate 200 is a color filter substrate for description, that is, as shown in FIGS. 2a and 2b, a second base substrate 200a of the opposed substrate 200 is provided with a color filter layer, and for example, the color filter layer may include a red filter pattern R, a green filter pattern G, and a blue filter pattern B. Of course, the opposed substrate 200 may also be a transparent substrate, and in this case, the fluid in the display region first fluid layer may be colored to realize color display.

The acceleration sensor 10 shown in FIGS. 2a and 2b and the acceleration sensor shown in FIGS. 1a and 1b have similar working principle, but have different capacitance values in static and moving states. Other structures of the acceleration sensor in the display device according to the embodiment may be also referred to the structure of the acceleration sensor described in Embodiment I.

Hereinafter, the capacitance values of the acceleration sensor 10 in the static and moving states will be respectively described by taking an example that the dielectric constant of the insulating gas 16 is $\epsilon_1$, the liquid in the liquid layer 14 is an insulating liquid and the dielectric constant thereof is $\epsilon_2$, and the dielectric constant of the display region hydrophobic layer 133 is $\epsilon_3$.

As shown in FIG. 2a, in a case where the acceleration sensor 10 is in the static state, the capacitance $C_1$ generated by the insulating gas 16 is $C_1=\epsilon_1 A/4\pi k d_1$, the capacitance $C_2$ generated by the liquid layer 14 is $C_2=\epsilon_2 A/4\pi k d_2$ and the capacitance $C_3$ generated by the display region hydrophobic layer 133 is $C_3=\epsilon_3 A/4\pi k d_3$, where A denotes an area in which both the first electrode 11 and the second electrode 12 correspond to the liquid layer 14, the insulating gas 16 and the display region hydrophobic layer 133, and the capacitance $C_0$ between the first electrode 11 and the second electrode 12 is $C_0=C_1 \oplus C_2 \oplus C_3$, where $\oplus$ denotes connection in series.

As shown in FIG. 2b, according to the principle of inertia, in a case where the acceleration sensor moves, the capacitance $C_{11}$ generated by a first portion (as shown on a left side of a dotted line in FIG. 2b) of the insulating gas 16 is $C_{11}=\epsilon_1 A_1/4\pi k d_1'$, the capacitance $C_{12}$ generated by a second portion (as shown on a right side of the dotted line in FIG. 2b) of the insulating gas 16 is $C_{12}=\epsilon_1 A_2/4\pi k d(d_1'+d_2')$, the capacitance C2' generated by the liquid layer 14 is $C2'=\epsilon_2 A_1/4\pi k d_2'$, the capacitance $C_{31}$ generated by a first portion (as shown in the left side of the dotted line in FIG. 2b) of the display region hydrophobic layer is $C_{31}=\epsilon_3 A_1/4\pi k d_3$, and the capacitance $C_{32}$ generated by a second portion (as shown on the right side of the dotted line in FIG. 2b) of the display region hydrophobic layer is $C_{32}=\epsilon_3 A_2/4\pi k d_3$, where $A_1$ denotes an area in which both the first electrode 11 and the second electrode 12 correspond to the liquid layer 14, the first portion of the insulating gas and the first portion of the display region hydrophobic layer, and $A_2$ denotes an area in which both the first electrode 11 and the second electrode 12 correspond to the second portion of the insulating gas and the second portion of the hydrophobic layer of the display region. The capacitance $C_0'$ between the first electrode 11 and the second electrode 12 is $C_0'=(C_{11} \oplus C_2' \oplus C_{31})//(C_{12} \oplus C_{32})$, where $\oplus$ denotes connection in parallel. Then, the displacement or the acceleration sensed by the acceleration sensor may be calculated according to $C_0$ and $C_0'$.

For example, the display device provided by the embodiment may be: a liquid crystal panel, an electrowetting display panel, an OLED panel, E-paper, a cell phone, a tablet computer, a television, a monitor, a notebook computer, a digital frame, a navigator or any other product or part having a display function.

In addition, FIGS. 2a and 2b both take an example that the display device comprises one acceleration sensor 10 for description, but the embodiments of the present disclosure are not limited thereto; in the sensing region, a plurality of (two or more than three) acceleration sensors 10 may also be arranged between the first base substrate 100a and the second base substrate 200a. Accelerations of these acceleration sensors may be calculated by arranging the plurality of acceleration sensors, and more accurate acceleration values may be acquired by a calculating method such as averaging or the like.

The display device integrated with the acceleration sensor 10 provided by the embodiment may realize health monitoring by using the acceleration sensor 10, and the principle of the health monitoring is that: an amount of change in the capacitance of the acceleration sensor in motion is calculated according to change of AC signal detected by a detecting circuit, so as to calculate a number of walking or running steps of a user, further calculating the displacement S moved by the user; and in addition, the acceleration sensor may further calculate calorie consumption according to the displacement moved by the user and the formula of displacement and energy consumption.

Embodiment III

Figure 3A:
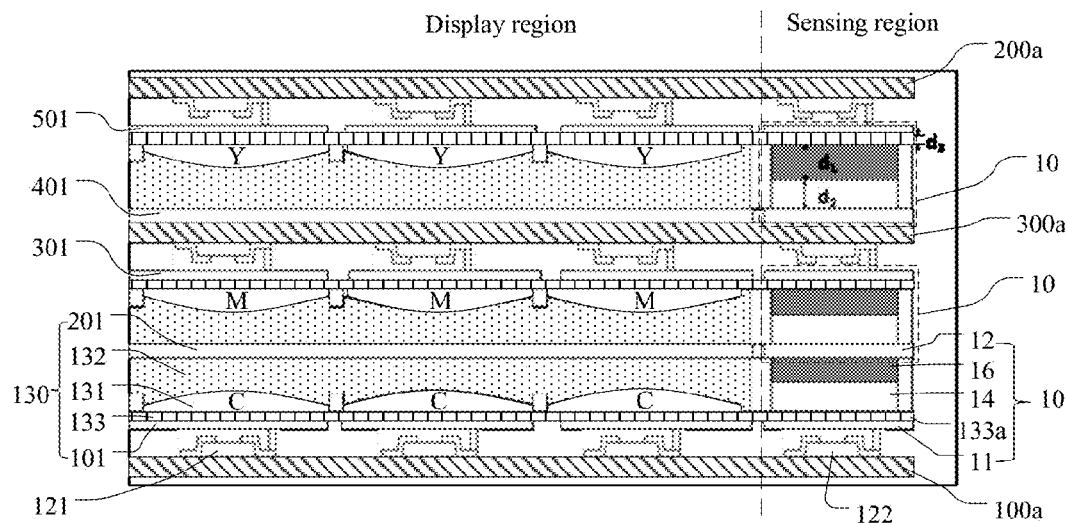
FIG. 3a is a structural schematic view of a display device provided by Embodiment III of the present disclosure.
Figure 3B:
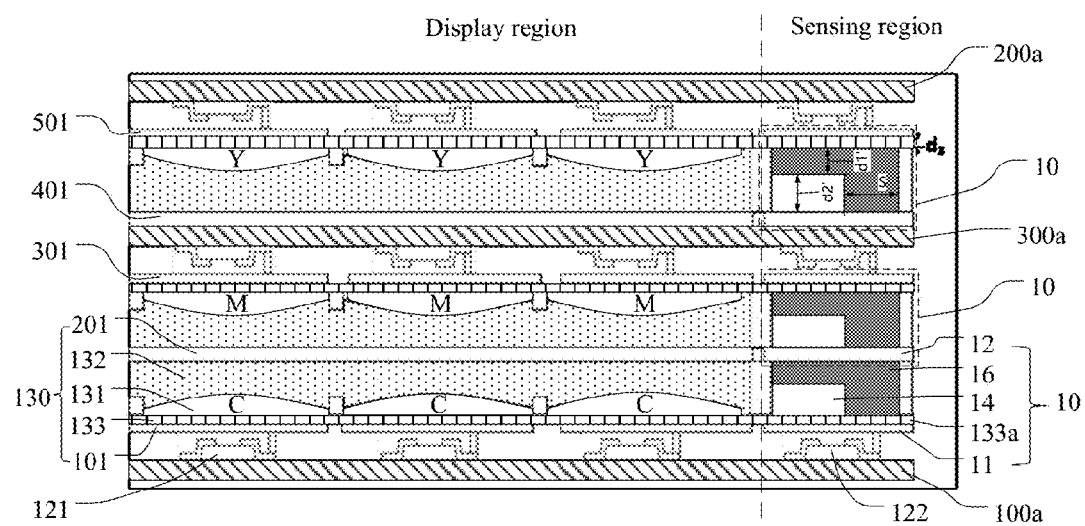
FIG. 3b is a structural schematic view of the acceleration sensor provided by Embodiment III of the present disclosure in a case of moving.

The embodiment provides a display device, and as shown in FIGS. 3a and 3b, the display device is different from the display device provided by Embodiment II in that: in a display region, a plurality of electrowetting structures 130 arranged sequentially are arranged in a direction perpendicular to a plane where the first base substrate 100a is located between the first base substrate 100a and the second base substrate 200a.

For example, as shown in FIGS. 3a and 3b, a plurality of acceleration sensors 10, preferably at least three acceleration sensors 10, may be arranged between the first base substrate 100a and the second base substrate 200a in a sensing region. With the arrangement of the plurality of acceleration sensors, accelerations of these acceleration sensors may be calculated, and more accurate acceleration values may be acquired by a calculating method such as averaging or the like.

For example, as shown in FIGS. 3a and 3b, the first electrode 11 and the second electrode 12 of the at least one acceleration sensor 10 may be arranged in the same layer as the first transparent electrode 101 and the second transparent electrode 201 of the one electrowetting structure 130, respectively. That is, the first electrode 11 and the first transparent electrode 101 may be formed in a same patterning process, and the second electrode 12 and the second transparent electrode 201 may be formed in a same patterning process. In this way, it is favorable to form the acceleration sensor 10 with the electrowetting structure 130 synchronously and improve a degree of integration of the acceleration sensor and the display panel.

For example, as shown in FIGS. 3a and 3b, the plurality of acceleration sensors 10 arranged in the sensing region may be arranged sequentially in a direction perpendicular to a plane where the first base substrate 100a is located, and thus the two electrodes of the plurality of acceleration sensors 10 are respectively fabricated with the two transparent electrodes of the plurality of electrowetting structures 130 synchronously. FIGS. 3a and 3b show a one-to-one corresponding arrangement between the electrowetting structures 130 and the acceleration sensors 10 arranged in the direction perpendicular to the first base substrate 100a, that is, in the structure one layer of the electrowetting structure 130 corresponds to one layer of the acceleration sensor 10. Thus, the two transparent electrodes (e.g., in the diagram, the two transparent electrodes 101 and 201 of the electrowetting structure in a lower layer, or the two transparent electrodes 201 and 301 of the electrowetting structure in an intermediate layer, or the two transparent electrodes 401 and 501 of the electrowetting structure in an upper layer) of each layer of electrowetting structure 130 and the two electrodes of the acceleration sensor 10 corresponding to the electrowetting structure 130 may be arranged in a same layer, respectively.

However, the embodiments according to the present disclosure are not limited thereto, the acceleration sensors may be not stacked one on another, or may be arranged in a direction parallel to a surface of the first base substrate 100a or in another arranging mode. In addition, FIGS. 3a and 3b respectively show three electrowetting structures and three acceleration sensors sequentially arranged in a direction perpendicular to the first base substrate, but the embodiments according to the present disclosure are not limited thereto, a number of which may be two or more than three.

In the embodiment, fluid in the display region first fluid layer 131 of the electrowetting structure 130 may be a black ink or a color ink which allows light of different colors to transmit to realize color display. For example, as shown in FIGS. 3a and 3b, the display region first fluid layers in the three electrowetting structures 130 may allow yellow (Y), magenta (M), and cyan (C) light to transmit, respectively.

An arrangement of each layer structure (including the electrowetting structure and the acceleration sensor structure) in the embodiment may be with reference to the description of a same structure in Embodiment II, which will not be repeated here.

Embodiment IV

The embodiment provides a detecting system and a detecting method for a display device, and the display device comprises at least three acceleration sensors, for example, the display device may be the display device provided by Embodiment III.

Figure 4A:
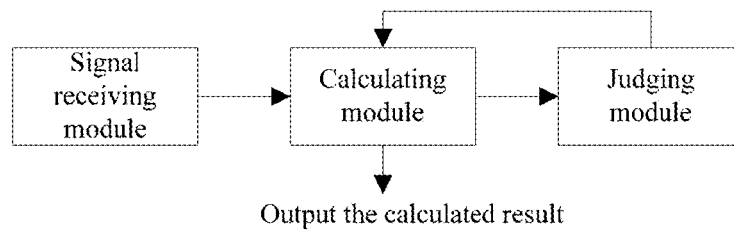
FIG. 4a is a structural block diagram of a detecting system provided by Embodiment IV of the present disclosure.

As shown in FIG. 4a, the detecting system comprises: a signal receiving module, a calculating module and a judging module. Hereinafter, these modules are described in detail.

The signal receiving module is configured to acquire a capacitance value (i.e., the capacitance value between the two electrodes of the acceleration sensor) of the acceleration sensor at a first time and a capacitance value of the acceleration sensor at a second time, respectively.

For example, the capacitance values of the acceleration sensors 10 located on the first base substrate 100a, the second base substrate 200a, and the third base substrate 300a at the first time (e.g., as shown in FIG. 3a) are $C_{01}$, $C_{02}$ and $C_{03}$, respectively, and the capacitance values at the second time (e.g., as shown in FIG. 3b) are $C_{01}'$, $C_{02}'$ and $C_{03}'$, respectively.

The calculating module is configured to: respectively calculate the a capacitance value change amount of each acceleration sensor according to the capacitance value at the first time and the capacitance value at the second time, respectively calculate a sensing result of the acceleration sensor according to the capacitance value change amount, and calculate an absolute value of a difference between a sensing result of each acceleration sensor and a sensing result of each of the remaining acceleration sensors. For example, the sensing result of each acceleration sensor may be an acceleration or a displacement sensed by the acceleration sensor.

Taking the case that the sensing result is the acceleration as an example, the calculating module may calculate the amounts of changes $\Delta C_1 = C_{01}' - C_{01}$, $\Delta C_2 = C_{02}' - C_{02}$, $\Delta C_3 = C_{03}' - C_{03}$ of the capacitance values of the acceleration sensors 10 in the sensing region; and then, the accelerations $a_1$, $a_2$ and $a_3$ of the acceleration sensors 10 are calculated; and then, absolute values $|a_1 - a_2|$ and $|a_2 - a_3|$ of differences between the acceleration of the acceleration sensor arranged on the first base substrate 100a and the accelerations of the other sensors, for example, are calculated.

The judging module is configured to determine whether the absolute value is in a predetermined threshold range. If the absolute value of the difference between the sensing result of one acceleration sensor and the sensing result of each of at least two of the remaining acceleration sensors is out of the predetermined threshold range, the sensing result of the acceleration sensor is determined not to be in a normal range.

For example, if the values $|a_1 - a_2|$ and $|a_1 - a_2|$ are out of the predetermined threshold range, the common changing value of the values $|a_1 - a_2|$ and $|a_1 - a_2|$, that is, the acceleration $a_1$, is out of the normal range.

After that, for example, the judging module may send the determining result to the calculating module, and the calculating module calculates a target acceleration $a = (a_2 + a_3)/2$ according to the accelerations $a_2$ and $a_3$ of the remaining acceleration sensors.

In a case where the sensing result is a displacement, a target displacement is calculated in a manner similar to that of the acceleration, which will not be described here.

Of course, if the absolute value of the difference between the sensing result of each acceleration sensor and the sensing result of each of the remaining acceleration sensors is out of the predetermined threshold range, the target acceleration "a" is an average value of the sensing results of all acceleration sensors.

The threshold range may be determined according to actual needs. For example, when the detecting system is used for detecting an acceleration when a person walks, and assuming that a maximum acceleration when the person walks is $a_m$, the predetermined threshold range may be from 0 to $a_m$ or a smaller range within a range from 0 to $a_m$.

For example, the signal receiving module, the calculating module and the judging module may be integrated into one chip.

The detecting system provided by the embodiment may be integrated with the display device, or may be arranged separately from the display device.

Accordingly, the detecting method provided by the embodiment comprises steps S1 to S3 as follows.

Step S1: acquiring a capacitance value of the acceleration sensor at a first time and a capacitance value of the acceleration sensor at a second time, respectively.

Step S2: respectively calculating an a capacitance value change amount of each acceleration sensor according to the capacitance value at the first time and the capacitance value at the second time, respectively calculating a sensing result of the acceleration sensor according to the capacitance value change amount, and calculating an absolute value of a difference between a sensing result of each acceleration sensor and a sensing result of each of the remaining acceleration sensors.

Step S3: determining whether the absolute value is in a determined threshold range. In the step, if the absolute value of the difference between the sensing result of one acceleration sensor and the sensing result of each of at least two of the remaining acceleration sensors is out of the predetermined threshold range, the sensing result of the acceleration sensor is determined not in a normal range.

Hereinafter, it is described by taking three acceleration sensors for example in connection with FIG. 4b.

Figure 4B:
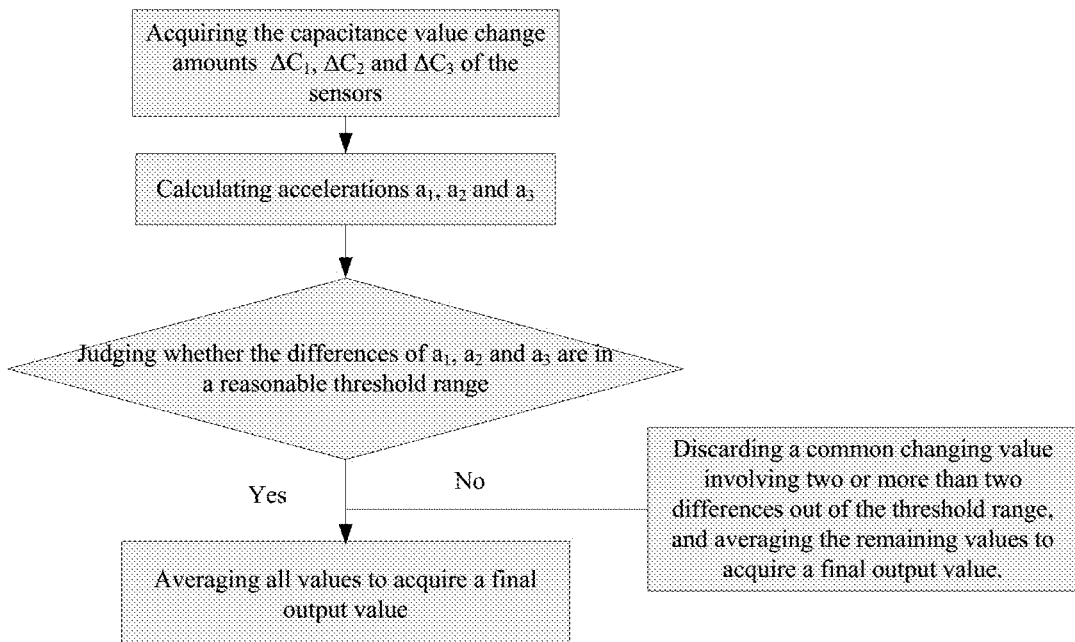
FIG. 4b is a flow chart of a detecting method provided by Embodiment IV of the present disclosure.

Step S2 is performed after step S1 is completed, and as shown in FIG. 4b, the amounts of changes $\Delta C_1$, $\Delta C_2$ and $\Delta C_3$ of the capacitance values of the sensors may be acquired; for example, displacements of the acceleration sensors are calculated according to the amounts of changes in the capacitance values, and then accelerations $a_1$, $a_2$ and $a_3$ are calculated; and then the absolute value of the difference in an acceleration (or a displacement) between each acceleration sensor and each of the remaining acceleration sensors is calculated.

For example, values $|a_1-a_2|$ and $|a_1-a_3|$ are calculated in step S2, and then it is determined in step S3 whether the values $|a_1-a_2|$ and $|a_1-a_3|$ are in the predetermined threshold range, that is, the step shown in FIG. 4b is performed, to determine whether the differences of $a_1$, $a_2$ and $a_3$ are in a reasonable threshold range. If so, all values are averaged to acquire a final output value $a=(a_1+a_2+a_3)/3$; if not, the common changing value involving two or more than two differences out of the threshold range is discarded, for example, if the values $|a_1-a_2|$ and $|a_1-a_3|$ are out of the predetermined threshold range, the common changing value $a_1$ is discarded and the remaining values are averaged to acquire a final output value $a=(a_2+a_3)/2$.

Steps S1 to S3 described above may be with reference to the description of the detecting system provided by the embodiment, which will not be repeated here.

The detecting system and the detecting method provided by the embodiment may be applied to a display device having at least three acceleration sensors, and a more accurate detecting result may be acquired by calculating an average acceleration after screening the sensing results of these acceleration sensors.

What are described above is related to the illustrative embodiments of the disclosure only and not limitative to the scope of the disclosure; the scopes of the disclosure are defined by the accompanying claims.

The application claims priority to the Chinese patent application No. 201510617496.1, filed Sep. 24, 2015, the entire disclosure of which is incorporated herein by reference as part of the present application.

What is claimed is:

1. A detecting system for a display device, the display device comprising at least three acceleration sensors, and each of the acceleration sensors comprising:
   two electrodes arranged opposite to and insulated from each other, and
   a cavity arranged between the two electrodes,
   wherein, a liquid layer is arranged in the cavity, and the liquid layer occupying a portion of internal space of the cavity; and
   the detecting system comprising:
   a signal receiving module, configured to acquire capacitance values of the at least three acceleration sensors at a first time and capacitance values of the at least three acceleration sensors at a second time, respectively;
   a calculating module, configured to respectively calculate a capacitance value change amount of each of the acceleration sensors according to the capacitance value at the first time and the capacitance value at the second time, respectively calculate a sensing result of each of the acceleration sensors according to the capacitance value change amount, and calculate an absolute value of a difference between a sensing result of each of the acceleration sensors and a sensing result of each of the remaining acceleration sensors; and
   a judging module, configured to determine whether the absolute value is in a predetermined threshold range, wherein, if an absolute value of a difference between a sensing result of one acceleration sensor and a sensing result of each of at least two of the remaining acceleration sensors is out of the predetermined threshold range, the sensing result of the acceleration sensor is determined not in a normal range,
   wherein, the sensing result is an acceleration or a displacement.

2. The detecting system for the display device according to claim 1, wherein, the cavity has an inner surface, and a gap is formed between the liquid layer and the inner surface.

3. The detecting system for the display device according to claim 2, wherein, the gap is filled with an insulating gas, the insulating gas having a dielectric constant different from that of liquid in the liquid layer.

4. The detecting system for the display device according to claim 3, wherein, the insulating gas is immiscible with the liquid in the liquid layer.

5. The detecting system for the display device according to claim 1, each of the acceleration sensors further comprising: a solid insulating layer, arranged between the liquid layer and one of the two electrodes.

6. The detecting system for the display device according to claim 1, wherein, the display device has a display region and a sensing region, and comprises an array substrate having a first base substrate and an opposed substrate arranged opposite to the array substrate and having a second base substrate;
   in the sensing region, each of the acceleration sensors is arranged between the first base substrate and the second base substrate;
   in the display region, an electrowetting structure is arranged between the first base substrate and the second base substrate, and the electrowetting structure includes:
   two transparent electrodes arranged opposite to each other, and
   a display region hydrophobic layer, a display region first fluid layer and a display region second fluid layer which are arranged between the two transparent electrodes, the display region first fluid layer being arranged between the display region hydrophobic layer and the display region second fluid layer in a direction perpendicular to a plane where the first base substrate is located.

7. The detecting system for the display device according to claim 6, wherein,
one of the two electrodes of each of the acceleration sensors and one of the two transparent electrodes of the electrowetting structure are arranged in a same layer; or
the two electrodes of each of the acceleration sensors and the two transparent electrodes of the electrowetting structure are arranged in same layers, respectively.

8. The detecting system for the display device according to claim 6, wherein, the display region hydrophobic layer of the electrowetting structure includes a portion extending to the sensing region; the cavity of each of the acceleration sensors comprises a sidewall, the sidewall being connected with the portion of the display region hydrophobic layer extending to the sensing region.

9. The detecting system for the display device according to claim 6, wherein, the display region first fluid layer of the electrowetting structure and the liquid layer of each of the acceleration sensors are made of a same material.

10. The detecting system for the display device according to claim 6, wherein,
a first thin film transistor and a second thin film transistor are arranged between the first base substrate and the second base substrate;
one of the two transparent electrodes of the electrowetting structure is electrically connected with the first thin film transistor; and
one of the two electrodes of each of the acceleration sensors is electrically connected with the second thin film transistor.

11. The detecting system for the display device according to claim 6, wherein,
a plurality of the electrowetting structures sequentially arranged in a direction perpendicular to a plane where the first base substrate is located are arranged between the first base substrate and the second base substrate in the display region.

12. The detecting system for the display device according to claim 11, wherein, a third base substrate is further arranged between the first base substrate and the second base substrate, the third base substrate being arranged between the two adjacent electrowetting structures.

13. The detecting system for the display device according to claim 11, wherein,
in the sensing region, a plurality of the acceleration sensors are arranged between the first base substrate and the second base substrate, and two electrodes of at least one of the acceleration sensors are respectively arranged in same layers as two transparent electrodes of one of the plurality of the electrowetting structures.

14. A detecting method for a display device, the display device comprising at least three acceleration sensors, and each of the acceleration sensors comprising:
two electrodes arranged opposite to and insulated from each other, and
a cavity arranged between the two electrodes,
wherein, a liquid layer is arranged in the cavity, and the liquid layer occupying a portion of internal space of the cavity; and
the detecting method comprising:
acquiring capacitance values of the at least three acceleration sensors at a first time and capacitance values of the at least three acceleration sensors at a second time, respectively;
respectively calculating an a capacitance value change amount of each of the acceleration sensors according to the capacitance value at the first time and the capacitance value at the second time, respectively calculate a sensing result of each of the acceleration sensors according to the capacitance value change amount, and calculate an absolute value of a difference between a sensing result of each of the acceleration sensors and a sensing result of each of the remaining acceleration sensors; and
determining whether the absolute value is in a predetermined threshold range, wherein, if an absolute value of a difference between a sensing result of one acceleration sensor and a sensing result of each of at least two of the remaining acceleration sensors is out of the predetermined threshold range, the sensing result of the acceleration sensor is determined not in a normal range,
wherein, the sensing result is an acceleration or a displacement.

15. The detecting method according to claim 14, wherein, the capacitance value of each of the acceleration sensors is a capacitance value between the two electrodes.

16. The detecting method according to claim 14, wherein, the cavity has an inner surface, and a gap is formed between the liquid layer and the inner surface.

17. The detecting method according to claim 16, wherein, the gap is filled with an insulating gas, the insulating gas having a dielectric constant different from that of liquid in the liquid layer.

18. The detecting method according to claim 17, wherein, the insulating gas is immiscible with the liquid in the liquid layer.

19. The detecting method according to claim 14, each of the acceleration sensors further comprising: a solid insulating layer, arranged between the liquid layer and one of the two electrodes.

20. The detecting method according to claim 14, wherein, the display device has a display region and a sensing region, and comprises an array substrate having a first base substrate and an opposed substrate arranged opposite to the array substrate and having a second base substrate;
in the sensing region, each of the acceleration sensors is arranged between the first base substrate and the second base substrate;
in the display region, an electrowetting structure is arranged between the first base substrate and the second base substrate, and the electrowetting structure includes:
two transparent electrodes arranged opposite to each other, and
a display region hydrophobic layer, a display region first fluid layer and a display region second fluid layer which are arranged between the two transparent electrodes, the display region first fluid layer being arranged between the display region hydrophobic layer and the display region second fluid layer in a direction perpendicular to a plane where the first base substrate is located.

* * * * *